United States Patent [19]
Fare et al.

[11] 3,821,193
[45] June 28, 1974

[54] ANTIVIRAL COMPLEX OF RNA AND POLYSACCHARIDE

[75] Inventors: Louis R. Fare, Lafayette Hill; Moshe Goore, Norristown; James F. Naylor, III, Paoli; Joseph R. Valenta, Strafford, all of Pa.

[73] Assignee: Smithkline Corporation, Philadelphia, Pa.

[22] Filed: Sept. 16, 1970

[21] Appl. No.: 72,835

Related U.S. Application Data

[63] Continuation-in-part of Ser. No. 865,506, Oct. 10, 1969, abandoned.

[52] U.S. Cl..... 260/209 R, 195/28 N, 260/211.5 R, 424/180
[51] Int. Cl...................... C07c 69/20, C07d 51/50
[58] Field of Search ................ 260/209 R, 211.5 R; 195/28 N

[56] References Cited
UNITED STATES PATENTS 3,163,638  12/1964  Miwa ............................ 260/211.5
3,304,238  2/1967   Laufer ........................... 260/211.5

FOREIGN PATENTS OR APPLICATIONS 7,677    0/1967  South Africa................... 260/211.5
691,881  0/1966  Belgium .......................... 260/211.5

OTHER PUBLICATIONS

"Jour. Amer. Chem. Soc." Vol. 82, 1960, pg. 5178.
"Proc. Nat. Academy of Science" Vol. 58, 1967, pg. 782 and pg. 1004.
"Nature" Vol. 218, pg. 542, 1968.
"Nature" Vol. 220, pg. 167, 1968.

Primary Examiner—Lewis Gotts
Assistant Examiner—Johnnie R. Brown
Attorney, Agent, or Firm—William H. Edgerton; Alan D. Lourie

[57] ABSTRACT

A complex of single-stranded ribonucleic acid and polysaccharide, having antiviral activity, is obtained from the mold *Cunninghamella blakesleeana*. The complex is separated into the polysaccharide and nucleic acid components by chromatography.

5 Claims, No Drawings

ANTIVIRAL COMPLEX OF RNA AND POLYSACCHARIDE

This application is a continuation-in-part of copending application Ser. No. 865,506, filed Oct. 10, 1969, and now abandoned.

This invention relates to new antiviral agents and to methods of using them.

The principal product aspect of the invention consists of a new complex of single-stranded ribonucleic acid (RNA) and a polysaccharide, which complex possesses broad-spectrum antiviral activity.

In a second product aspect, the invention consists of pharmaceutical compositions containing the new complex.

In a third product aspect, the invention consists of the polysaccharide component of the complex.

In a fourth product aspect, the invention consists of pharmaceutical compositions containing the polysaccharide component.

In a first process aspect, the invention consists of a method of treating or preventing infections by administering to a susceptible or infected warm-blooded mammal an effective, but nontoxic, amount of the complex.

In a second process aspect, the invention consists of a method of treating or preventing infections by administering to a susceptible or infected warm-blooded mammal an effective but nontoxic amount of the polysaccharide.

The invention also consists of processes for preparing the complex and the polysaccharide.

The complex of this invention can be isolated from the mold *Cunninghamella*, particularly from the species *C. Blakesleeana* and *C. bainieri*. *Cunninghamella blakesleeana* is readily available from various culture collections, including the American Type Culture Collection, as ATCC 8688a. Other strains of *Cunninghamella* are *C. Bainieri*, ATCC 8987, *C. bainieri*, ATCC 9244, *C. elegans*, ATCC 7929, and *C. echinulata*, ATCC 8984.

The mold is grown according to conventional methods, well-described in textbooks and other publications, in a medium favorable to its development. Liquid media, such as nutrient broth, trypticase soy broth, soybean meal broth or peanut meal broth are preferred for submerged fermentations. The media should contain sources of available carbon, nitrogen and minerals.

Carbohydrate, such as starches, dextrins and sugars including hexoses and pentoses may be used to furnish the energy and carbon requirements of the microorganisms. Other sources of carbon may also be used, for example, citric acid and its salts, sodium acetate, alcohols or fatty acids.

Sources of nitrogen in assimilable form are made available by soluble or insoluble vegetable or animal protein and protein derivatives such as soybean meal, casein, meat extracts and peptones. Amino acids, ammonium salts, nitrates, corn steep liquor or yeast extract can also be used.

Minerals naturally present in the above carbon and nitrogen sources are sufficient to satisfy the requirements of the microorganisms.

A sterile air supply should be maintained during the fermentation. This is accomplished by exposing a large surface of the growth medium to the atmosphere with constant agitation, or alternatively by the use of submerged aeration devices. Aeration at the rate of about 0.5 to 2.0 volumes of air per volume of growth medium per minute produces satisfactory results.

During the fermentation the temperature should be maintained within a range of about 23°C. to 32°C., preferably from about 25°C. to 30°C. One preferred medium comprises 2 percent (w/v) potato extract (Difco) and 2 percent (w/v) dextrose adjusted to pH 6.5 with sodium hydroxide, under sterile conditions at 26–28°C. Lard oil is used as an antifoam agent. The fermentation is allowed to proceed for 5–10 days, preferably 5 days, the cells are then harvested, and the RNA-polysaccharide complex isolated and purified. The following chart indicates the manner in which the complex is isolated.

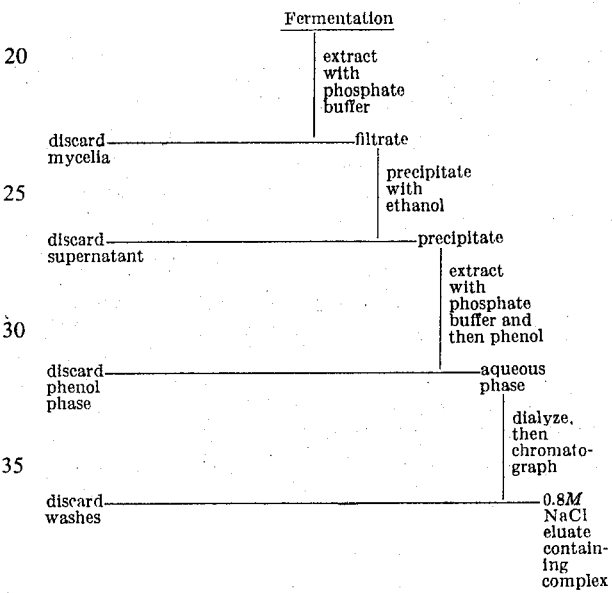

Isolation of RNA-Polysaccharide Complex

The mycelia obtained from the fermentation are suspended in a buffer of about pH 8, 0.1M sodium phosphate being preferred. Stirring and heating aid in extracting the complex into the buffer solution. The mixture is filtered and the filtrate treated with any appropriate organic solvent, including acetone and methanol, preferably ethanol, to precipitate the complex. Homogenization of the precipitate with a buffer of pH 7–8, preferably 0.01M sodium phosphate, followed by extraction with a water-saturated phenol, gives an aqueous solution of the complex from which most of the denatured protein has been removed. The solution is dialyzed against a 0.01M sodium phosphate buffer of pH 7.2 and further purified by chromatography.

The isolated complex possesses an ultraviolet spectrum typical of a nucleic acid, with a maximum at 257 m$\mu$ and a minimum at 230 m$\mu$. The 260–280 m$\mu$ and 260–230 m$\mu$ absorption ratios are both greater than 2, indicating the absence of protein or polypeptide. Protein determinations by the Lowry method [J. Biol. Chem. 193, 269 (1951)] confirm this conclusion.

Alkaline and acid hydrolysis of the complex, or the RNA fraction which can be separated from it, yields the bases adenine, guanine, uracil, and cytosine, which are identified by paper chromatography [Biochem. J. 46, 33 (1950)]. Cochromatography with known standards and spectrophotometric measurements confirm this identification.

Absence of deoxyribonucleic acid is shown by the diphenylamine method. [Methods of Biochemical Analysis, Interscience, N.Y. 1 (1964)].

The pentose content of the purified complex as measured by the orcinol reaction is much higher (approx. 3-fold) than that found in pure RNA, due to the polysaccharide. Gas chromatographic measurements of the alditol acetate derivative of the purified, separated polysaccharide fraction indicate that fucose, galactose, glucose, mannose, and other unidentified pentoses and tetroses are among the monomeric components. Also, chemical analysis indicates the presence of sulfate in the polysaccharide.

The molecular weight of the complex is considered to be in the range of 50,000–100,000, since the $S_{W20}$ of the complex, as determined by the Spinco Model E analytical ultracentrifuge, is approximately 4.8. The molecular weight of the purified RNA fraction is estimated in the range of 30,000–60,000, since the $S_{W20}$ value is 2.2.

Analysis of a thermal denaturation curve of the complex shows that it lacks a thermal transition midpoint (melting point), indicating that the RNA is not double-stranded.

The complex is highly resistant to the action of pancreatic RNAase action, but after removal of the polysaccharide by DEAE-cellulose chromatography, the RNA fraction becomes readily digestible by the enzyme. The resistance to RNAase action may be due to the presence of the polysaccharide fraction, which may either inhibit the action of the enzyme or stabilize the RNA component, making it inaccessible to enzymatic degradation.

The RNA-polysaccharide complex of the present invention has been shown to possess activity against a variety of viral infections. Although it has been shown to induce interferon in a host animal, correlation between the antiviral activity and interferon induction has not been established thus far.

Tests in a mouse Mengo virus infection indicate that some antiviral activity is possessed by each of the separated, purified RNA and polysaccharide fractions. A mixture of the two fractions is also active, but the original complex possesses even greater activity. These results are shown in Table I, below, which indicates the increase in the percent survival of mice administered the test material intraperitoneally 18 hours prior to infection with the Mengo virus.

TABLE I

| Test material | Comparison of Antiviral Activity of Complex, Mixture, and Separated Fractions Dose (mg./kg) | Increase % Survival |
|---|---|---|
| RNA fraction | 29 | 40 |
| Polysaccharide fraction | 29 | 40 |
| Mixture of 2 fractions (14.5 mg. each) | 29 | 60 |
| Complex | 29 | 80 |
| Control | — | 0 |

The complex was well-tolerated by the mice. The acute $LD_{50}$ in mice was greater than 200 mg/kg. i.p. Administration of 100 mg/kg. i.p. resulted in no deaths or weight loss. The complex has been shown to protect primary rabbit kidney cell cultures infected with vesicular stomatitis virus (VSV). Infection of the cells with virus for 46–60 hours at 37°C. results in plaque formation, due to lysis of the cells as a result of virus multiplication. Since there is a direct correlation between the number of plaques formed and the concentration of the virus used to infect the cells, the reduction in the number of plaques is a measure of inhibition of viral growth. The infected rabbit kidney cell cultures are treated with the RNA-polysaccharide complex for 24 hours, after which the antiviral agent is removed and the cell sheet washed once with the maintenance medium. The cell monolayer is challenged with vesicular stomatis virus. After an incubation period of 60 hours, the virus plaques are counted and the percent reduction in plaques is calculated in relation to the number of plaques in the untreated controls.

As shown in Table II, 1.25 μg of the preparation is sufficient to reduce the number of plaques by 82 percent.

TABLE II

| Protection of Cell Cultures against VSV | |
|---|---|
| Dose (μg/4 ml.) | % Inhibition of Plaques |
| 5 | 100 |
| 2.5 | 87 |
| 1.25 | 82 |
| 0.625 | 13 |
| 0.313 | 9 |
| 0.151 | 5 |
| 0.075 | 1 |
| 0.038 | 0 |
| Control | 0 |

The complex has also been found to protect mice against pneumonia virus (PVM). PVM infection of mice by a 40 minute exposure to an aerosol of the virus suspension results in a respiratory virus infection culminating in pneumonia. Approximately 70 percent to 100 percent of the control animals die over a period of 4 to 5 days starting 8 or 9 days post-aerosol exposure. The ultimate cause of death is suffocation which is the result of lung consolidation. To evaluate the effectiveness of the complex a solution of the complex was administered intranasally to 5 groups of twenty 8–10 gram mice 18 hours prior to aerosol virus challenge (90 percent lethal dose). The results of such an experiment are shown in Table III, below. They indicate that as low as 5 μg per mouse of the complex administered intranasally resulted in an increased survival of 40%; while 20 μg resulted in 80% increased survival.

TABLE III

| Protection of Mice against Pneumonia Virus | |
|---|---|
| Dose (mg/kg) | Increased % Survival |
| 2.2 | 80 |
| 0.44 | 40 |
| 0.088 | 0 |
| Control | 0 |

Mice infected with Mengo virus begin to die of encephalitis three days after infection. A lethal dose of the virus (75 percent to 100 percent lethality) is administered intraperitoneally. To determine the effectiveness of the antiviral agent against this infection, a solution of the complex is administered to mice (10–11 grams) via the same route. The mice are observed for 10 to 14 days at which period most or all of the untreated mice are dead. As is shown in Table IV, below, in a minimal dose of 20 μg (1.82 mg/kg) per mouse, the increased percent survival is 45%.

TABLE IV

Protection of Mice against Mengo Encephalitis Virus

| Dose (mg./kg) | Increased % Survival |
|---|---|
| 29.0 | 75 |
| 7.28 | 75 |
| 1.82 | 45 |
| 0.45 | 0 |
| Control | 0 |

The complex is also effective against vaccinia virus infection. Mice in this infection develop hard lesions after a period of 6–7 days. When the complex is administered intraperitoneally 18 hours prior to intravenous challenge with a dose of virus causing 15–25 tail lesions and, after 8 days, the number of tail lesions counted, the results shown in Table V, below, were obtained. A minimal dose of 12 μg per mouse (0.6 mg/kg) of the complex reduces the number of lesions by more than 50 percent.

TABLE V

Protection of Mice against Vaccinia Virus

| Dose (mg./kg) | % Decrease in No. of Tail Lesions |
|---|---|
| 60 | 95 |
| 6 | 46 |
| 0.6 | 56 |
| Control | 0 |

The complex of the invention can be separated into its ribonucleic acid and polysaccharide components by DEAE-cellulose chromatography. The polysaccharide has a molecular weight in the 10,000–30,000 range and is orcinol positive. It has a high uronic acid content, 30–50 percent of the sugar monomers having carboxyl groups. Gas chromatography indicates the presence of fucose, glucose, galactose, mannose, and tetroses.

The following Table VI illustrates the efficacy of the polysaccharide against several viral infections in the mouse. The minimal effective dose (MED) is defined as the amount of material required to increase the percent survival by 30 percent compared to controls. In the vaccinia tail test, MED is defined as the amount required to reduce the number of tail lesions by 30 percent compared to controls.

TABLE VI

| Infection | MED (mg/kg) |
|---|---|
| Pneumonia | 0.2 |
| Mengo encephalitis | 10 |
| Vaccinia virus | 2 |
| Influenza $A_2$ | 20 |

The complex or the polysaccharide of this invention are formulated into compositions for use as an antiviral agent. The compositions are administered to a subject or host either to prevent or treat a viral infection by a variety of routes, including orally, by injection or with the use of an inhaler or aerosol in effective, but nontoxic, doses. The appropriate dose will vary with the subject being treated, the nature of the infection, and the age and weight of the subject. It will, however, be within the range of 10–500 mg per dose. Such factors can be evaluated more precisely by those administering the complex or polysaccharide, using the information disclosed herein and the skill and experience of the art.

An injectable formulation may consist of a solution of the active antiviral component in normal saline solution, water, or sugar solution, possibly with preservatives such as Merthiolate or parabens added.

An aerosol formulation is prepared by combining an active antiviral material, dissolved or dispersed in a suitable solvent, optionally combined with propellants, and packaging the formulation in a suitable dispenser.

The following examples are intended to illustrate the practice of the invention, but are not to be construed as limiting the scope thereof. Temperatures are in degrees Centigrade, unless otherwise stated. DEAE-cellulose, as is well known in the art, is diethylaminoethyl cellulose.

EXAMPLE 1

The mold *Cunninghamella blakesleeana*, ATCC 8688a, is grown in 90 liters of medium comprising 2 percent w/v potato extract (Difco) and 2 percent w/v dextrose adjusted to pH 6.5 with sodium hydroxide. The medium is autoclaved at 121°, 15 psig, for 15 minutes. 10 Liters of a culture grown in the same medium for 24–72 hours at 26°–28° serve as the inoculum for the fermentation. The fermentation proceeds for 5 days at 26°–28° with an aeration rate of 0.5-0.75 VVM and agitation rate of 75 to 125 RPM. Lard oil is used as an antifoam agent.

The mycelia (7 Kg.) obtained from the fermentation are suspended in 30 liters of 0.1 M sodium phosphate buffer, previously heated to 55°. The suspension is stirred vigorously for 2 hours, during which time the temperature is maintained at 55°–60°. At the end of this period, the cell debris are filtered off and the filtrate retained. Of the extraction period the cell debris is filtered off and the filtrate or extract retained.

To the filtrate is added 70 liters of 95 percent ethanol (2½ × the volume of the original extract). After thorough mixing, the solution is kept at 4° overnight to allow the precipitate which has formed to settle. The clear supernatant is decanted carefully and the precipitate, which still contains some buffer-alcohol mixture, is centrifuged at 10,000 × g. The supernatant is removed, and the precipitate is homogenized with 1 liter of 0.01 M sodium phosphate buffer, pH 7.2, in which the RNA-polysaccharide is soluble. The homogenized material is stirred for 1 hour to allow efficient extraction of the complex. Insoluble material is then removed by centrifugation at 10,000 × g.

The homogenate is then mixed with an equal amount of water - saturated phenol, and the mixture shaken at room temperature for 2 hours. This step is essential, for it removes most of the denatured protein which could be toxic if injected into animals. Phases are separated by centrifugation at 5,000–10,000 × g. and the aqueous layer (usually the lower phase) is collected and washed several times with ether to remove traces of phenol. The extract is dialyzed against three portions of 10 liters of 0.01 M sodium phosphate buffer, pH 7.2. The dialyzed material is rich with RNA-polysaccharide complex and could be used as such. However, further purification can be accomplished by employing DEAE-cellulose chromatography to remove inactive polysaccharide with is precipitated in the ethanol step.

DEAE-cellulose, obtained commercially, is washed according to a standard procedure and then equilibrated with 0.01 M tris buffer at pH 7.2. A column 20 cm × 2 cm is prepared. A sample after the phenol extraction step, containing 8,000–10,000 $A_{260}$ units previously dialyzed against the equilibrating buffer, is applied to the column at the rate of 1 ml per minute. After application of the sample, the column is washed with 150 ml of 0.01 M tris buffer, pH 7.2, and with 150 ml of 0.1 M NaCl in this buffer. The active RNA-polysaccharide complex is then eluted with 0.8 M NaCl in 0.01 M tris buffer, pH 7.2. Fractions of 10 ml are collected and the absorbance at 260 m$\mu$ is read. The fractions containing high 260 m$\mu$ absorption (higher than 1 unit) are pooled and dialyzed against 10 volumes of 0.01 M sodium phosphate buffer, pH 7.2, or distilled water. About 80 percent to 90 percent of the activity applied to the column is recovered. After dialysis the pooled fraction can be used as such or concentrated by lyophilisation or precipitation with alcohol. The concentrated material can be reconstituted with 0.01 M phosphate buffer, pH 7.

EXAMPLE 2

When, instead of fermenting C. blakesleeana and carrying out the isolation procedures set forth in Example 1, C. bainieri, ATCC 8987 or 9244, C. elegans, ATCC 7929, C. echinulata, ATCC 8984, or other Cunninghamella species is used and the same procedures applied, the complex consisting of single-stranded RNA and polysaccharide is obtained.

EXAMPLE 3

An antiviral composition for intranasal use may have the following components:

| | |
|---|---|
| complex of RNA and polysaccharide or polysaccharide alone | 20 mg |
| aqueous buffer | 20 mg |
| preservative may be added | |
| Package in spraypack | |

EXAMPLE 4

An antiviral composition for injectable use may consist of the complex or polysaccharide suspended or dissolved in a suitable isotonic vehicle such as physiological saline.

EXAMPLE 5

The RNA-polysaccharide complex can be separated into a ribonucleic acid fraction and a polysaccharide fraction by DEAE-cellulose chromatography as follows: a DEAE-cellulose column 40 cm × 2 cm is equilibrated with 0.01 M tris buffer, pH 7.2. A sample containing 90 mg based on RNA content (or 180 mg. based on total carbohydrate content as determined by the orcinol method), is applied to the column at a flow rate of 1 ml per minute. The sample is then eluted with a linear gradient of sodium chloride in 0.01 M tris buffer, pH 7.2. The gradient is formed with two chambers containing 1 liter of 0.01 M tris buffer, pH 7.2, and 1 liter of 1 M NaCl in 0.01 M tris buffer, pH 7.2, respectively. The rate of flow of the eluent is 1 ml per minute. Fractions of 10 ml are collected and the carbohydrate content and the absorbance at 260 m$\mu$ of each fraction are determined. The carbohydrate fraction is eluted in fractions 20 to 30 and the RNA is eluted immediately thereafter, in fractions 32–50. This corresponds to a salt concentration of 0.15 M for the polysaccharide and 0.3 M for the RNA. The polysaccharide content of the fractions is determined by the orcinol method while the fractions containing RNA are determined according to their absorbance at 260 m$\mu$. Fractions containing the polysaccharide are pooled and those containing the RNA are pooled, then each is dialyzed against 0.01 M sodium phosphate buffer, pH 7.2. About 60 mg. of each material is obtained.

EXAMPLE 6

An antiviral capsule may have the following composition:

| | |
|---|---|
| Complex or polysaccharide | 10–500 mg. |
| Lactose, starch or terra alba | 10–500 mg. |

EXAMPLE 7

An antiviral tablet may have the following composition:

| | | |
|---|---|---|
| Complex or polysaccharide | | 10–100 mg. |
| Magnesium stearate | | 2.5 |
| Starch | | 15. |
| Terra alba | | 150. |
| Granulate with syrup or gelatin (5% solution) | | |
| Terra alba | q.s. ad | 300 |

We claim:

1. A complex of single-stranded ribonucleic acid and polysaccharide, obtained from the mold Cunninghamella and having antiviral activity, exhibiting a maximum absorption at 257 m$\mu$ and a minimum at 230 m$\mu$ in the ultraviolet spectrum, the absorption ratios at 260–280 m$\mu$ and 260–230 m$\mu$ being greater than 2; the alkaline or acid hydrolysis of which complex yields adenine, guanine, uracil and cytosine; having a molecular weight in he range of 50,000–100,000, the ribonucleic acid portion of which has a molecular weight in the range of 30,000–60,000 and the polysaccharide portion of which has a molecular weight in the range of 10,000–30,000; the thermal denaturation curve of said complex lacking a sharp thermal transition midpoint; said complex being resistant to the action of pancreatic RNAase; the ribonucleic acid and polysaccharide components of which complex are separable on DEAE cellulose; the polysaccharide component of which complex contains fucose, galactose, glucose, mannose, tetroses, and sulfate; and 30–50 percent of sugar monomers of said polysaccharide having carboxyl groups.

2. A polysaccharide having antiviral activity, obtained from the mold Cunninghamella, said polysaccharide having a molecular weight of 10,000–30,000; 30–50 percent of the sugar monomers of said polysaccharide having carboxyl groups; and containing sulfate and monomers of fucose, mannose, galactose, glucose, and tetroses.

3. A polysaccharide as claimed in claim 2, obtained from cells of the mold Cunninghamella which have been grown 5–10 days.

4. A process for preparing an antiviral complex of single-stranded ribonucleic acid and polysaccharide comprising growing cells of a mold of the genus Cunninghamella in a suitable nutrient medium for 5–10 days, harvesting the cells, extracting the cells with a buffer of about pH 8, filtering the resulting mixture, precipitating the complex from the filtrate by addition of an organic solvent, extracting the precipitate with a buffer of pH 7–8 and then with phenol, and dialyzing the resulting aqueous solution against a buffer of pH 7.2 to obtain the complex.

5. A process for preparing an antiviral polysaccharide comprising preparing a complex of single-stranded ribonucleic acid and polysaccharide according to claim 4 and separating the polysaccharide from the complex by chromatography on DEAE-cellulose and eluting with a linear gradient of sodium chloride in 0.01 M tris buffer, pH 7.2.

* * * * *